United States Patent [19]

Slettemoen

[11] Patent Number: 4,733,964

[45] Date of Patent: Mar. 29, 1988

[54] DEVICE FOR JOINING LIGHT WAVES

[75] Inventor: Gudmunn Slettemoen, Tiller, Norway

[73] Assignee: Conspectum A/S, Trondheim, Norway

[21] Appl. No.: 847,281

[22] Filed: Apr. 2, 1986

[30] Foreign Application Priority Data

Apr. 12, 1985 [NO] Norway .................. 851471

[51] Int. Cl.⁴ .................................. G01B 9/025
[52] U.S. Cl. .................. 356/35.5; 356/347; 356/354
[58] Field of Search ............ 350/3.6, 3.67, 3.83, 350/3.84, 3.7, 3.72; 356/35.5, 354

[56] References Cited

FOREIGN PATENT DOCUMENTS 1568212  5/1980  United Kingdom ........... 356/354

OTHER PUBLICATIONS

Applied Optics, vol. 17, No. 4, 2/15/78, "Interferometric Testing with Computer-Generated Holograms", pp. 558-565.
Applied Physics Letters, vol. 14, No. 11, 6/1/69, "Submicrosecond Holographic Cine-Interferometry of Transmission", F. C. Jahoda.
Optics Communications, vol. 12, No. 4, 12/1974, pp. 421-426, "Holographic Vibration Measurement . . . with Target Vidicon".
NDT International, vol. 15, No. 3, 6/82, "An Instrument for Vibration Mode Analysis Using Electronic Speckle Pattern Inferferometry".

Primary Examiner—Davis L. Willis
Assistant Examiner—Matthew W. Koren
Attorney, Agent, or Firm—Kenyon & Kenyon

[57] ABSTRACT

A device for joining light waves by interferometric focusing optics and a small reflector with a cylindrical or spherical surface, which is positioned in the aperture of the object imaging optics so that the reference wave is reflected towards the picture detector and covers this. An auxiliary device comprising one or more reflecting surfaces may be positioned in the path of the beam behind the reflector so that the reference wave can be coarsely adjusted toward the reflector. In the extension of the path of the reference wave from the mirror via the lens to the reflector, a viewing screen may be positioned such that one by means of the naked eye can do coarse adjustment of the reference wave which focuses on the reflector.

8 Claims, 4 Drawing Figures

DEVICE FOR JOINING LIGHT WAVES

The present invention relates to a device for joining waves of light as disclosed in the preamble to claim 1.

By some methods of optical measurement, the light wave from the light source is split into two paths of light. One part travels via the object to be measured and is called the object wave while the other part is called the reference wave. Before the object wave and the reference wave reach the picture detector they must be rejoined.

Such a method of measuring is "Electronic Speckle Pattern Interferometry" (ESPI) which can be utilized for deformation and vibration analyses.

Several such devices for joining light waves are known, and one shall here mention the use of a beam splitter which functions in that the object wave travels directly through a tilted wedge-shaped glass plate, while the reference wave is reflected from the glass plate where the object wave leaves it, so that both waves impinge the picture detector.

The wave splitter has the disadvantage that dirt and scratches on the surface reduce the picture quality. This gives a bad signal/noise relationship. In addition, a wave splitter requires much light since merely a small portion of the incoming light is reflected. This gives bad light economy.

It is further known to tilt a mirror with an aperture through which the reference wave passes while the object wave is reflected in toward the piture detector.

Since it in practice is difficult to make a combination of a focusing lens and an aperture placed sufficiently close to the mirror surface, we may receive troublesome effects of diffraction. Since in practice the distance from the mirror to the picture detector becomes several times greater than by use of said beam splitter, this solution will require much space if it shall be built into a measuring instrument.

A problem concerning these known devices is that adjustments during the joining process are difficult.

The above problems are solved by means of the present invention as disclosed in the characterizing clause of claim 1.

Further characteristics of the invention are stated in the subclaims.

According to the present invention, the light waves are joined by means of a device comprising a small reflector with a cylindrical or spherical surface positioned in a shutter aperture, so that the object wave will travel through the aperture and the reference wave be reflected from the reflector and thus both waves impinge upon the detector. The size of the reflector must be adjusted to the distance from the picture detector. The aperture for this device which focuses on the reflector is to be determined by the size and shape of the reflector.

By means of this joining device one achieves a joining which does not have the disadvantage of the two known devices. One obtains a short distance from the joining device to the picture detector. The quality of the wave becomes high and the loss of light small. The device also gives the possibility of simultaneously joining more than one couple of beams. The device is also easier to adjust than a wave splitter and a mirror with an aperture.

The invention shall now be further described with reference to the drawings where FIG. 1 shows a known holographic set-up for a further clarification of ESPI;

For a further understanding of ESPI, usual holography will be taken as the point of departure.

Figure 1:
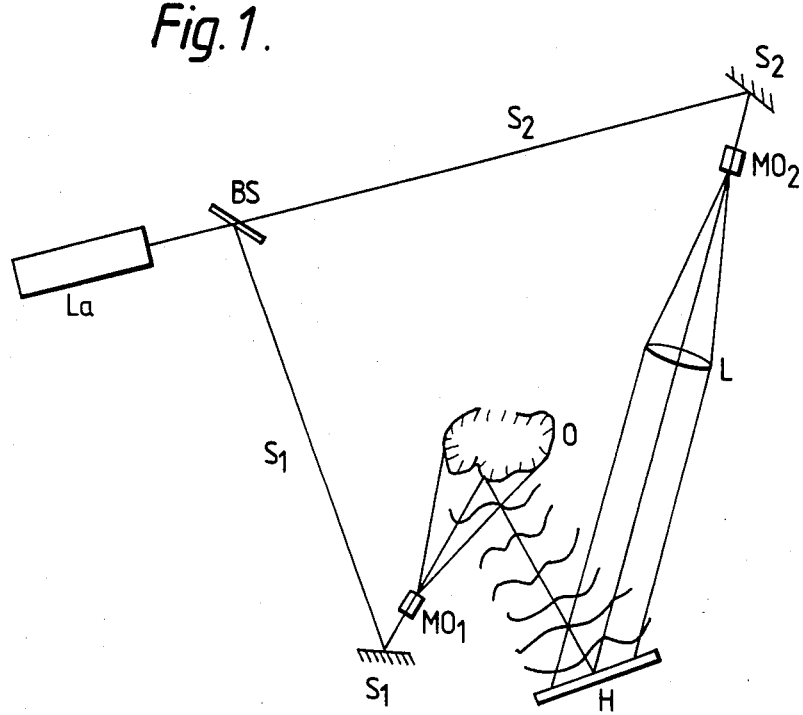

FIG. 1 shows a typical holographic set-up where a laser wave from a laser LA is divided in two by means of a wave splitter BS. The wave S1 travels via a mirror S1 and a microscope objective MO1 to illuminate an object O. The light is spread (reflected) from the object O and some of the light hits the light sensitive holographic plate H. This light wave is called the object wave and the wave front is determined by the surface of the object.

The light beam S2 travels via a mirror S2, a microscopic objective MO2 and a lens L and illuminates the holographic plate H directly. This wave is called the reference wave. The two waves interfere with each other and form a microscopic pattern on the holographic plate H during exposure.

After development the plate H is set back in the same position and the object wave is blocked (possibly the object O may be removed). The reference wave which now is called the reconstruction wave, will be bent in this photographic plate and form a wave which is approximately like the original object wave. One can now "see" the object through the holographic plate in its three-dimensional nature.

For measuring deformations (out of the plane), one takes an exposure before and after the deformation. At the reconstruction one can now see the object overlaid with stripes disclosing the deformation (corresponding to the contour lines on a topographical map). In the same way one may obtain a map of the amplitude distribution at steady-state fluctuations by exposure through one or more oscillation periods.

Figure 2:
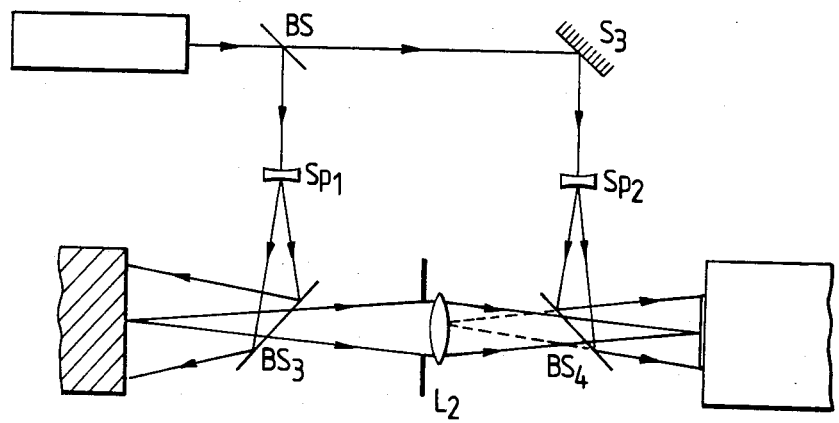
FIG. 2 shows an ESPI set-up.

ESPI is in principle much like holography. The holographic plate is exchanged with a TV camera (with less resolving power than the holographic plate) and one aligns the reference wave and the object wave. The object is depicted on the camera target via a lens L2; cf. FIG. 2, which shows a typical ESPI set-up.

The object wave which is focused on the target is in the form of comparatively coarse-grained speckle points (an interference pattern which is caused by the high coherence of the laser).

The object wave also interferes with the reference wave. By moving the object the rough pattern on the target is changed. The pattern returns to the original if the moving of the object is like $N/2\lambda$, N-O, 1, 2, ... ($\lambda$=the wave length of the laser). By storage of pictures before and after deformation and subtraction of the pictures, we obtain a fringe pattern which discloses the deformation.

Steady-state fluctuations can be analyzed by exposure through several oscillation periods. There is no upper limit for the frequency of oscillations in ESPI analyses.

The present invention is directed toward joining the reference wave and the object wave so that this system can be made compact and more stable against shocks and vibrations, and simultaneously producing a device which is simple to use in, for example, vibration measurements.

Figure 3:
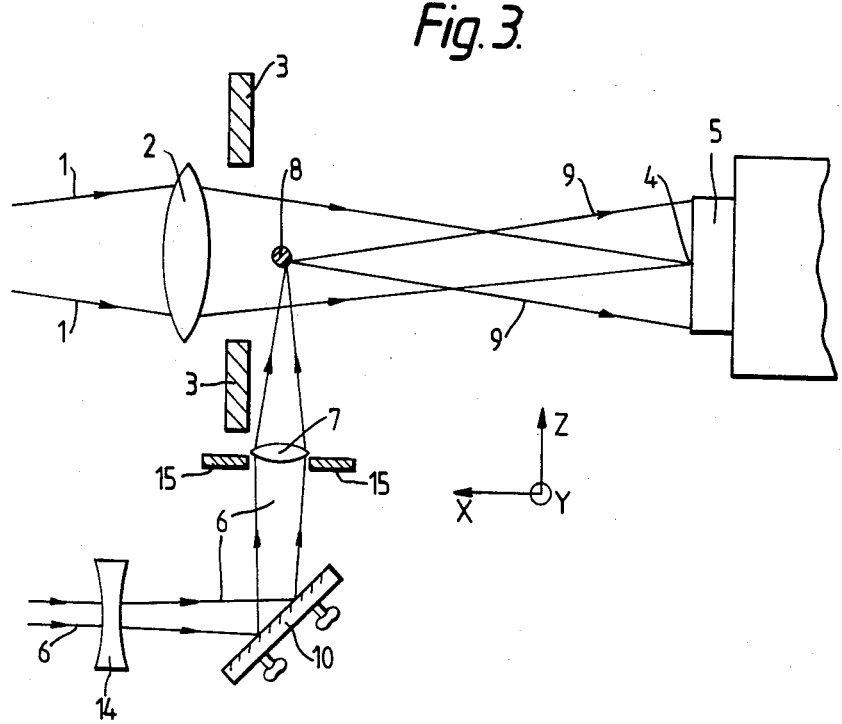
FIG. 3 shows the main principle for the joining device according to the present invention.

FIG. 3 shows the main principle for the joining device according to the invention. The object wave from one selected object point travels through a lens 2 and a aperture 3 and forms a picture point 4 on the picture detector 5. The reference wave 6 comes via an adjustable negative lens 14, an adjustable mirror 10 and a focusing lens 7, is narrowed down by the aperture 15 and is focused on the cylindrical or spherical reflector 8 so that one has an even spread of the reference wave 9 reflected towards the picture detector 5. In this example, the reference wave 6 which is focused on the reflector 8 can be adjusted in the side directions of the X and Y axes in that the mirror 10 is tilted (rotated around the X and Y axes) and in that the distance between the lens 7 and the reflector 8 can be regulated (the Z axis) or in that the distance between lens 7 and lens 14 can be changed.

By replacing the aperture 15 of the lens 7 by a split-shaped aperture and by replacing or combining the lens 7 with cylinder optics, the quality of the beam can be further improved.

Figure 4:
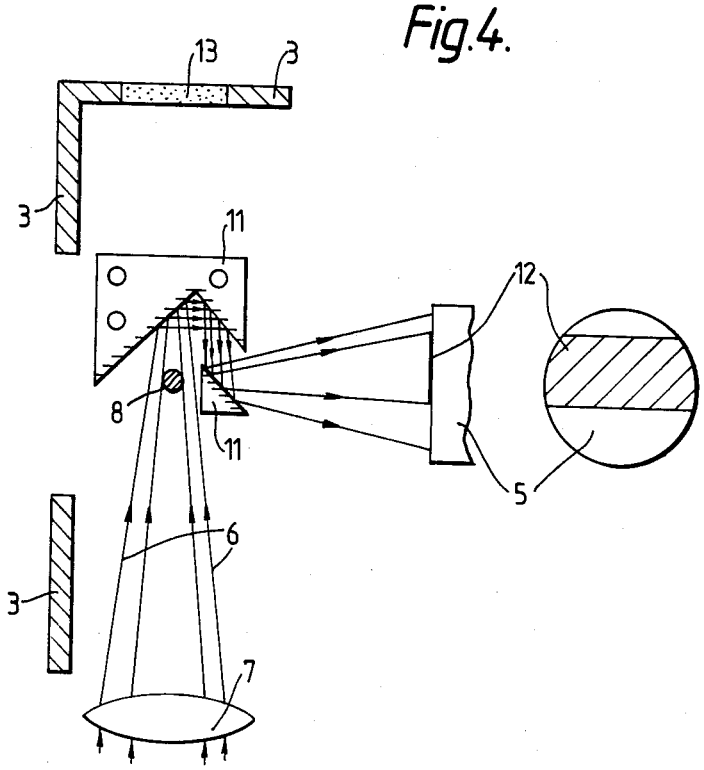
FIG. 4 shows auxiliary devices which may be used for a rough adjustment of the reference wave toward the picture detector.

FIG. 4 shows two auxiliary devices which may be used for a rough adjustment of the reference wave 6 towards the picture detector.

A cylindrical reflector 8 is selected. An auxiliary device 11 which can be moved parallel to the axis of the reflector 8 is positioned around the active portion of the reflector 8. The auxiliary device 11 consists of one or more reflecting surfaces, so that the reference wave 6 which does not hit the reflector 8 will be reflected towards the picture detector 5 and we will receive a shadow FIG. 12 of the cylindrical reflector 8 when this is out of focus. Thereafter one may adjust the mirror 10 and one of the lenses 7 or 14, as mentioned above in connection with FIG. 1, so that the shadow 12 of the reflector 8 covers the whole of the picture detectore 5. The same adjustment can be achieved by moving the reflector 8. Thereafter one moves the auxiliary device 11 away from the path of the reference analysis, and the joining device is roughly adjusted. Another way in which one may roughly adjust the reference wave 6 is to place a viewing screen 13 behind the reflector 8 so that one by means of the naked eye can see whether the reflector 8 functions correctly or not.

Having described my invention, I claim:

1. A device for joining an object wave and a reference wave for interferometric analysis, where the object wave passes through an aperture before reaching a picture detector, comprising:
    object wave imaging optics having an imaging aperture for imaging said object wave; and
    a reflector having a convex reflective surface positioned in the path of said object wave in said imaging aperture to reflect said reference wave so as to cover said picture element, said reflector being smaller than said imaging aperture.
2. A device as claimed in claim 1, further comprising an auxiliary device having one or more reflective surfaces, said auxiliary device being removably mounted in the path of said reference wave to facilitate course adjustment of the reference wave with respect to the picture detector.
3. A device as claimed in claim 1, further comprising:
    means for visually viewing said reference wave positioned so that said reference wave extends from said reflector to said visual viewing means; and
    means for adjusting said reference wave with respect to said reflector.
4. A device as claimed in claim 1, further comprising a focusing element for said reference wave, said focusing element including a first lens for focusing said reference wave at said detector and a shutter for forming a first slit shaped rectangular aperture for said lens.
5. A device as claimed in claim 4, wherein said object wave imaging optics comprises:
    a second lens to image said object wave at said picture detector; and
    a shutter to define a second slit shaped aperture for said lens.
6. A device as claimed in claim 1, wherein said object wave imaging optics comprises:
    a second lens to image said object wave at said picture detector; and
    a shutter to define a second slit shaped aperture for said lens.
7. A device as claimed in claim 1, wherein said reflector has a cylindrical reflective surface.
8. A device as claimed in claim 1, wherein said reflector has a spherical reflective surface.

* * * * *